United States Patent [19]
Anupam et al.

[11] Patent Number: 6,070,185
[45] Date of Patent: May 30, 2000

[54] TECHNIQUE FOR OBTAINING INFORMATION AND SERVICES OVER A COMMUNICATION NETWORK

[75] Inventors: Vinod Anupam, Scotch Plains; Narain H. Gehani, Summit, both of N.J.

[73] Assignee: Lucent Technologies Inc., Murray Hill, N.J.

[21] Appl. No.: 08/850,532

[22] Filed: May 2, 1997

[51] Int. Cl.[7] ............................. G06F 13/38; G06F 15/17
[52] U.S. Cl. ........................ 709/204; 709/202; 709/203; 709/205; 709/206; 709/217; 709/219; 709/227; 709/228; 709/230; 707/501; 707/514; 345/330; 345/331; 345/332; 345/335
[58] Field of Search ..................... 709/204, 202, 709/203, 217, 219, 227, 228, 230, 205, 206; 345/335, 330, 331, 332; 707/514, 501

[56] References Cited

U.S. PATENT DOCUMENTS

| | | | |
|---|---|---|---|
| 5,774,670 | 6/1998 | Montulli | 709/227 |
| 5,815,149 | 9/1998 | Mutschler, III et al. | 345/335 |
| 5,844,553 | 12/1998 | Hao et al. | 345/329 |
| 5,855,015 | 12/1998 | Shoham | 707/5 |
| 5,862,330 | 6/1999 | Anupam et al. | 709/204 |
| 5,877,759 | 3/1999 | Bauer | 345/339 |
| 5,884,312 | 3/1999 | Dustan et al. | 707/10 |
| 5,908,469 | 6/1999 | Botz et al. | 713/201 |
| 5,915,091 | 6/1999 | Ludwig et al. | 709/204 |
| 5,918,012 | 6/1999 | Astiz et al. | 709/217 |
| 5,933,811 | 8/1999 | Angles et al. | 705/14 |
| 5,933,816 | 8/1999 | Zeanah et al. | 705/35 |
| 5,938,723 | 8/1999 | Hales, II et al. | 709/204 |
| 5,943,497 | 8/1999 | Bohrer et al. | 395/701 |
| 5,944,783 | 8/1999 | Neiten | 709/202 |
| 5,946,464 | 8/1999 | Kito et al. | 709/202 |
| 5,959,623 | 9/1999 | Van Hoff et al. | 345/333 |
| 5,978,817 | 11/1999 | Giannandrea et al. | 707/501 |

OTHER PUBLICATIONS

Devid M. Kristol et al., HTTP State Management Mechanism, http://portal.research.bell–labs.com/~dmk/cookie–v–er.html/ 13 Pages, Nov. 4, 1996.
"Shared Mosaic," http://www.eit.com/goodies/software/share_mosaic/sh–mosaic.html, Ver.2.pre2, p. 1.
"Usage for Shared Mosaic," http://www.eit.com/goodies/software/share_mosaic/shared–mosaic–usage.html, p. 1.
"Shared Mosaic Features," http://www.eit.com/goodies/software/share_mosaic/shared–mosaic–features.html, ver. 2.pre2, p. 1.
"Shared Mosaic TODO List," http://www.eit.com/goodies/software/share_mosaic/shared–mosaic–todo.html, Ver.2.pre2, p. 1.
"Look@Me A Timbuktu Applet with Netscape Plug–in," http://collaborate.farallon.com/www/look/ldown.html, pp. 1 & 2.
"EMSL Collaborative Research Environment (CORE)," http://www.emsl.pnl.gov:2080/docs/tour/index.html, pp. 1 & 2.

*Primary Examiner*—Frank J. Asta
*Assistant Examiner*—Bunjob Jaroenchonwanit

[57] ABSTRACT

In a communications arrangement, a computer user accesses a server system to seek customer service over the World Wide Web (WWW). The server system assigns a customer service agent (CSA) to communicate with the user to realize the customer service. In a customer service session, the user and CSA may collaboratively browse hypertext markup language (HTML) documents at different uniform resource locators (URLs) to obtain relevant information. However, in accordance with the invention, the version of each document presented to the user may be different from that presented to the CSA. In particular, the CSA version contains proprietary information which is excluded from the user version.

63 Claims, 3 Drawing Sheets

TECHNIQUE FOR OBTAINING INFORMATION AND SERVICES OVER A COMMUNICATION NETWORK

FIELD OF THE INVENTION

The invention relates to communications systems and methods, and in particular to systems and methods for allowing users to obtain information and services on the World Wide Web (WWW) or the "web".

BACKGROUND OF THE INVENTION

Computer users can access many information resources on an expansive international network of computer networks known as the Internet. The WWW is a, graphical subnetwork of the Internet. With common "web browser" software such as the NETSCAPE NAVIGATOR and INTERNET EXPLORER browsers, the users can readily access Internet information and services provided by web servers on the WWW.

Many Internet services allow communications between users. For example, two or more computer users may access a designated web server providing a "text-chat" service, whereby users may interactively communicate in text with one another in real time.

Computer users can also share a web browsing experience using a collaborative browsing scheme disclosed in U.S. Pat. No. 5,862330 issued Jan. 19, 1999 to Anupam et al. In accordance with this scheme, the users are provided with capabilities of collaborative or shared browsing of hypertext markup language (HTML) documents at various uniform resource locators (URLs) (or website addresses) on the WWW. Specifically, in a collaborative browsing session, the users are able to go from one URL to another in a synchronous manner and browse the same HTML documents provided at the URLs. At the same time, the users are also able to exchange information among themselves in text.

SUMMARY OF THE INVENTION

While the collaborative browsing arrangement of the type just described is desirable in that the users can share the same web information in real time, an aspect of this arrangement has been recognized by us to be disadvantageous in certain applications. In particular, in customer service applications, a customer should not always be able to browse the same information as a service representative. In order to efficiently help the customer, the service representative may need proprietary information, e.g., the customer's credit history, in addition to the information which can be shared with the customer.

The present invention, however, overcomes this shortcoming by distinguishing requests for the same data based on indicator information in such requests. When a request for particular data is received by a web server, the indicator information is used to select a version of the particular data corresponding thereto, and the originator of the request is then presented with the selected version only. In a preferred embodiment, the indicator information identifies the originator of the request. In a customer service application, if the indicator information identifies that the originator is a service representative, he/she is then presented with a first version of the requested data. If the indicator information identifies that the originator is a customer, he/she is then presented with a second version of the requested data. The first version may be different from the second version, and may include more information, e.g., the proprietary information, than the second version.

BRIEF DESCRIPTION OF THE DRAWING

The present invention will be more fully appreciated by consideration of the following detailed description, when read in light of the accompanying drawing in which.

DETAILED DESCRIPTION

Figure 1:
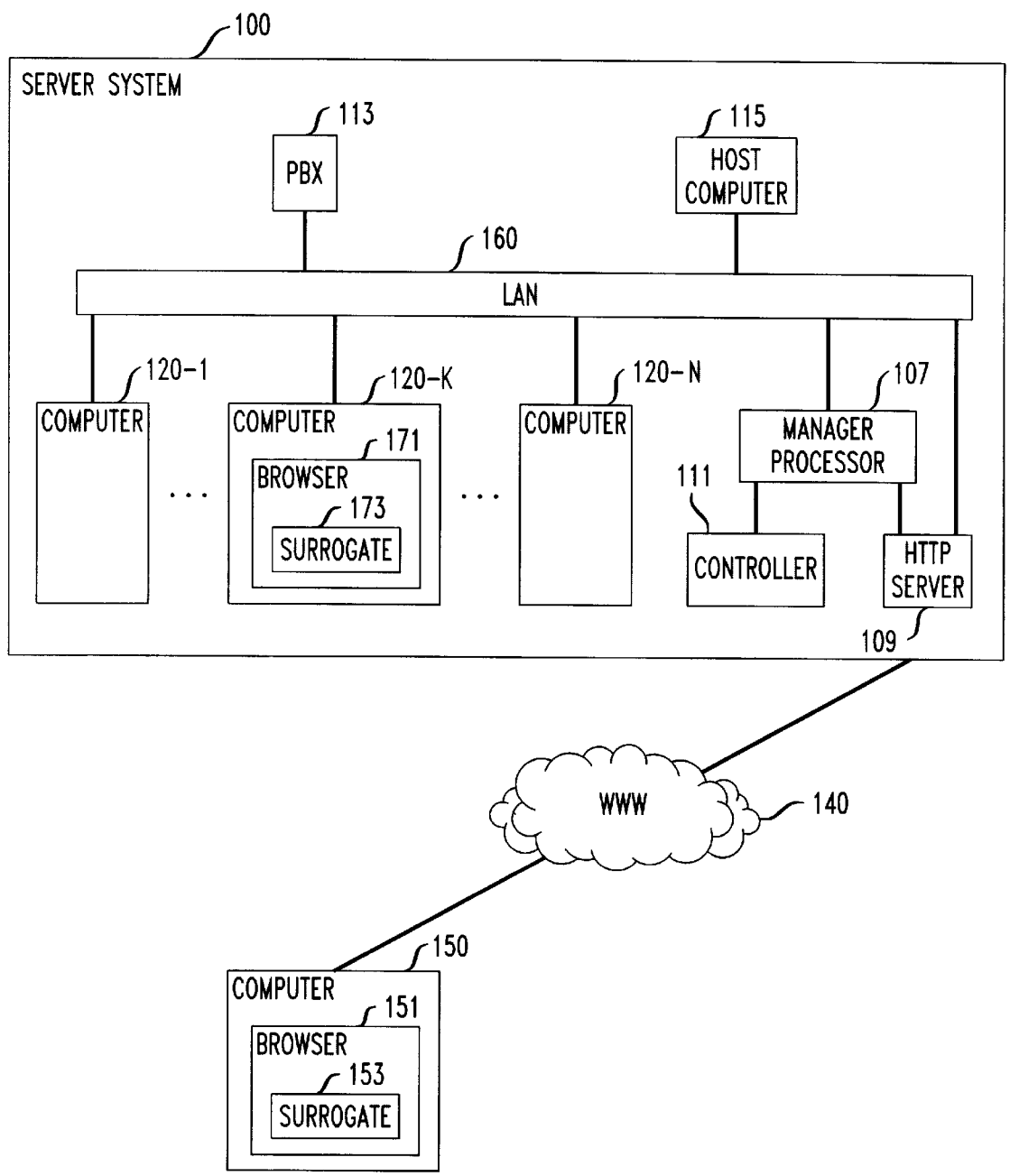
FIG. 1 illustrates a communications arrangement in accordance with the invention wherein a server system provides information and services over the WWW to users.

FIG. 1 illustrates a communications arrangement embodying the principles of the invention wherein server system 100 provides information and services over a communication network. In this particular illustrative embodiment, server system 100 resides in a customer service center of a company and provides product information and customer service via World Wide Web (WWW) 140. Such customer service includes helping customers to place orders for different products that the company markets, responding to customers' account inquiries and complaints, and providing other customer support.

System 100 works compatibly with standard web browsers such as the NETSCAPE NAVIGATOR and INTERNET EXPLORER browsers, the standard hypertext transfer protocol (HTTP) and hypertext markup language (HTML). System 100 realizes the customer service by allowing a user and customer service agent (CSA) to browse in a collaborative fashion HTML documents which may relate to the user's account, and to communicate interactively with each other in real time, e.g., using a text-chat capability.

As shown in FIG. 1, a user may utilize computer 150 to access system 100 over WWW 140 at a predetermined uniform resource locator (URL). Computer 150 may be a conventional personal computer (PC) running standard web browser 150, such as the NETSCAPE NAVIGATOR browser. In accessing system 100, browser 151 first establishes a connection to HTTP server 109 having a common gateway interface (CGI) (not shown). The CGI includes programs which define certain functions of server 109 to be described. As soon as the connection between browser 151 and server 109 is established, server 109 retrieves from host computer 115 home page information, and a customer identification (ID) number assigned to the user for identifying him/her temporarily. Server 109 then generates an HTML document representing the home page, and a "customer cookie" incorporating the customer ID number. It transmits the HTML document and customer cookie to browser 151 through the established connection.

Figure 2:
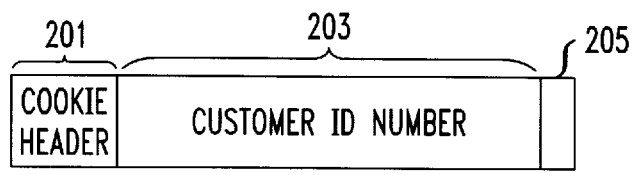
FIG. 2 illustrates the format of a cookie for identifying a user in accordance with the invention.

After the customer cookie is received by browser 151, it is stored within the browser. FIG. 2 illustrates the format of a generic customer cookie. As shown in FIG. 2, the customer cookie comprises field 201 containing a cookie header, field 203 containing the customer ID number, and bit 205 indicating whether the user has been referred to a CSA. At this point, the value of bit 205 is zero, indicating that the user has not been referred to any CSA in this session. The bit pattern of the cookie header bears a predetermined relation to the customer ID number and bit 205, and can be used to identify that the cookie in question is a customer cookie. The function of the customer cookie is fully described hereinbelow. It suffices to know for now that each time when browser 151 communicates to HTTP server 109, the communication is accompanied by the customer cookie, in accordance with the invention.

Figure 3:
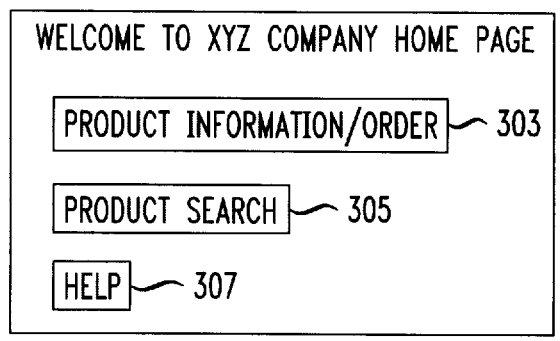
FIG. 3 illustrates a home page furnished by the server system.

Upon receipt of the HTML document, browser 151 opens the document and causes the home page to be displayed on computer 150. FIG. 3 illustrates such a home page. As shown in FIG. 3, the home page comprises displayed options 303, 305 and 307. In a conventional manner, the user can select any one of the options by pointing and clicking at the option using a mouse device or similar indicator device (not shown). Specifically, selection of option 303 enables the user to learn about the different products that the company markets. In addition, it allows the user to place an order for any products he/she wants to purchase in the course of browsing the product information. Selection of option 305 enables the user to search for particular products that the user has in mind. Selection of HELP option 307 enables the user to contact a CSA to obtain customer service.

In order to realize such customer service, each CSA needs to log onto server system 100 beforehand. To that end, the CSA utilizes a respective one of conventional computers 120-1 through 120-N, each running a standard browser, to log onto the system when he/she checks in at the customer service center, where N is an integer greater than zero. In this instance, one such CSA during a check-in has utilized computer 120-K having browser 171 to perform a login process, where $1 \leq K \leq N$. In accordance with this login process, browser 171 first establishes a connection to HTTP server 109 via local area network (LAN) 160. The CSA then transmits through browser 171 a pre-assigned login ID and a pre-selected password to server 109 for verification thereof.

After server 109 determines that the CSA is an authorized agent based on a record stored in host computer 115 concerning the CSA which includes a copy of the CSA's correct login ID and password, server 109 causes computer 115 to update the record to reflect the availability of the CSA. The host computer then assigns an agent ID number identifying the CSA and transmits same to server 109, along with standby information. Based on the received information, HTTP server 109 generates an HTML document representing a standby web page. In addition, server 109 generates an "agent cookie" incorporating the agent ID number.

Server 109 transmits the agent cookie, HTML document to browser 171 via LAN 160, along with predetermined mobile code which is described hereinbelow. As is well known in the art, mobile code is portable platform-independent code which can be dynamically loaded through a network and executed on a computer. The cookie is then stored in browser 171. The HTML document is opened by the browser to display the standby web page on computer 120-K, which requests the CSA to stand by at the computer to render customer service.

The aforementioned mobile code is written in a mobile programming language such as the standard JAVA language. In this instance, the mobile code is in the form of a JAVA applet. After the mobile code is received by browser 171, the mobile code runs within the browser to create surrogate 173. A surrogate is an assistant to a browser. In particular, surrogate 173, which is further described hereinbelow, serves as an assistant to browser 171 to carry out collaborative browsing of HTML documents, e.g., in providing customer service. Manager processor 107 administers such a collaborative browsing session. Therefore, as soon as surrogate 173 comes into being, it establishes a connection to manager processor 107.

Referring briefly to FIG. 3, assuming in this instance that the user at computer 150 selects HELP option 307 to seek customer service to correct a billing error. Accordingly, browser 151 communicates the selection to HTTP server 109, along with the customer cookie identifying the user. In response, HTTP server 109 informs manager processor 107 of the user's request for customer service, and forwards the customer cookie information to same.

Figure 4:
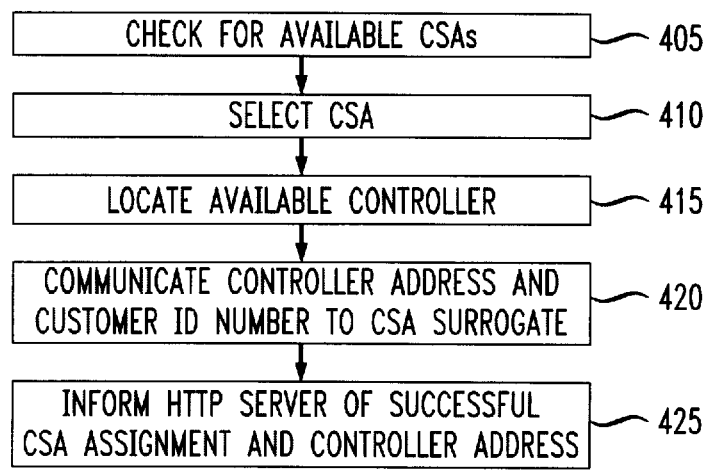
FIG. 4 is a flow chart depicting the steps taken by a manager processor in the server system to arrange for customer service.

FIG. 4 is a flow chart depicting the steps taken by manager processor 107 to realize the necessary arrangement between the user and a CSA to effect the customer service. Upon learning the user's request, manager processor 107 checks the agent database in host computer 115 for available CSAs, as indicated at step 405. In accordance with a predetermined selection scheme, manager processor 107 at step 410 selects one of the available CSAs, say, the CSA at computer 120-K, to provide the customer service. At step 415, manager processor 107 locates an available controller, say, controller 111 in this instance, to conduct the required collaborative document browsing in a customer service session. The address of the selected controller and the customer ID number (included in the customer cookie) are then communicated by manager processor 107 to surrogate 173, as indicated at step 420.

Upon receipt of the controller address and customer ID number, surrogate 173 discontinues its connection to manager processor 107 and establishes a new connection to controller 111. In addition, surrogate 173 generates a CSA cookie to replace the stored agent cookie based on the agent ID number (appearing in the stored agent cookie) and the received customer ID number.

Figure 5:
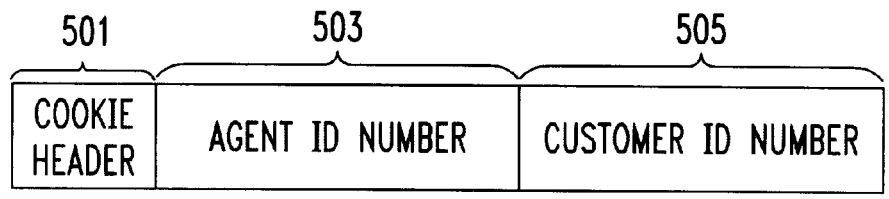
FIG. 5 illustrates the format of a cookie for identifying a customer service agent in accordance with the invention.

FIG. 5 illustrates the format of a generic CSA cookie. As shown in FIG. 5, the CSA cookie comprises fields 501, 503 and 505, and is formed in this instance by simply appending the customer ID number and the agent ID number to a cookie header. The bit pattern of the cookie header bears the same predetermined relation as above to the customer and agent ID numbers, and can be used to identify that the cookie in question is a CSA cookie. In accordance with the invention, each time when browser 171 communicates to HTTP server 109, the communication is accompanied by the CSA cookie.

At step 425, manager processor 107 informs HTTP server 109 of the successful assignment of a CSA to provide the customer service, and the address of controller 111 for use by a surrogate to be created in browser 151. Similar to surrogate 173, this surrogate, which is further described hereinbelow, serves as an assistant to browser 151 to carry out collaborative browsing of HTML documents in obtaining customer service. Server 109 then retrieves information concerning a user login web page from host computer 115, generates an HTML document representing the web page, and updates the customer cookie. The updated customer cookie differs from the previous version in that the value of bit 205 is now "1", reflecting the fact that the user has been referred to a CSA. Server 109 transmits to browser 151, the controller address, HTML document, and updated customer cookie, along with predetermined mobile code in the form of a JAVA applet.

After the mobile code is received by browser 151, the mobile code runs within browser 151 to create surrogate 153. Using the received controller address, surrogate 153 establishes a connection to controller 111. It should be noted that in this illustrative embodiment, surrogates 153 and 173 serve as interfaces between the respective browsers and controller 111. Among other things, surrogates 153 and 173 monitor the user input and the CSA input to browsers 151 and 171, respectively, and report the respective inputs to controller 111.

In addition, browser 151 substitutes the received, updated customer cookie for the previous cookie, and opens the received HTML document to display the user login page on computer 150. On this page, the user is prompted to enter a user login ID and password which are pre-selected by him/her during a prior registration. It should be noted that the login ID is associated with the actual identity of the user, such as his/her name, account number, etc., which were recorded in the registration. The user login ID and password entries are transmitted to HTTP server 109 for verification thereof, along with the current customer cookie. In a conventional manner, if the login ID and/or password is invalid, the user is afforded a predetermined number of additional times to enter the correct login ID and password before he/she is denied further access to system 100. Otherwise, if server 109 determines that the login ID and password are valid, it causes host computer 115 to update its customer service database to reflect an association of the user login ID, and thus his/her actual identity, with the customer ID number, which appears in the customer cookie. This association is important in that when host computer 115 later processes a data retrieval request accompanied by the customer cookie or CSA cookie which contains the customer ID number, host computer 115 based on the association can efficiently retrieve the data relevant to the user in question only. As a result, accidental disclosure of confidential data of another user is effectively avoided.

After the successful login by the user, server 109 retrieves information concerning an agent service web page from host computer 115, and generates an HTML document representing the web page. This document is transmitted to browser 171. Upon opening this document, browser 171 causes computer 120-K to display thereon the agent service page. This page includes information concerning the name and account number of the customer to be served by the CSA. In addition, a dialog box appears on the page which is similar to that on a customer service web page which is described hereinbelow. It suffices to know for now that the CSA can start communicating with the customer by entering text into the dialog box.

Figure 6:
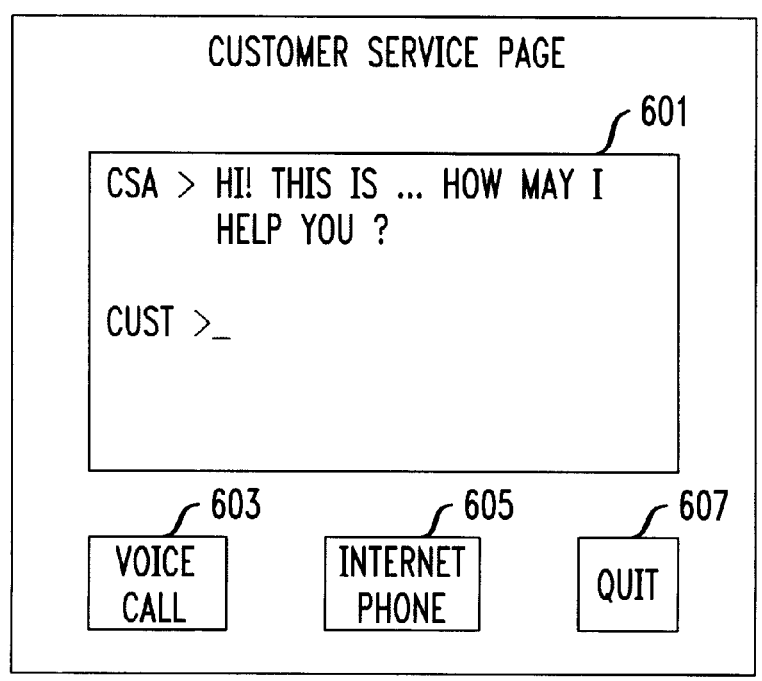
FIG. 6 illustrates a customer service web page furnished by the server system.

In addition, server 109 retrieves customer service page information from host computer 115, and generates an HTML document representing the customer service page. This document is transmitted to browser 151. Upon opening this document, browser 151 causes computer 150 to display thereon the customer service page. This page is illustrated in FIG. 6, and includes, for example, dialog box 601, VOICE CALL option 603, INTERNET PHONE option 605, and QUIT option 607.

Dialog box 601, similar to that on the above agent service page, allows the user to communicate in real time with the CSA in text. To that end, surrogates 153 and 173 are programmed to provide this "text-chat" capability which involves an exchange of textual communications through controller 111. In this instance, the CSA has started a dialog in box 601 with a standard greeting, waiting for a response from the user.

As an alternative to the textual communications, the user may request voice communications with the CSA, instead. Option 603 allows the user to communicate with the CSA by ordinary telephone. However, it should be noted that even when the user is on the phone with the CSA, he/she needs to continue to use computer 150 to realize the customer service session involving collaboratively browsing of documents with the CSA in accordance with the invention.

When option 603 is selected, the user is prompted for his/her telephone number. As soon as this number is entered and received by HTTP server 109, the latter passes it onto manager processor 107. Accordingly, server 109 causes computer 120-K to display a message to the CSA, such as "a voice call in progress," to alert the CSA of an imminent, incoming phone call. Processor 107 then retrieves from host computer 115 the telephone number of the CSA, and causes private branch exchange (PBX) 113 to establish a phone connection between the user and CSA.

Option 605 allows the user to communicate with the CSA via an Internet phone (not shown) which may be integrated into computer 150. Similarly, the Internet phone of the CSA may be integrated into computer 120-K. When option 605 is selected, HTTP server 109 informs manager processor 107 of such a selection. After learning the internet protocol (IP) port number associated with browser 171, processor 107 informs HTTP 109 of the number, which in turn transmits the number to browser 151. In a well known manner, using the received IP port number, browser 151 causes the user's Internet phone to initiate a call over the Internet to the CSA to realize the voice communications. Finally, option 607 allows the user to quit the current customer service session. When this option is selected, server 109 causes bit 205 of the customer cookie to be changed to "0", indicating that the user is no longer served by the CSA. Accordingly, the CSA becomes available to assist other customers.

By way of example, in the current customer service session, the user has communicated in text to the CSA a potential billing error. In order to solve the problem efficiently, the CSA needs to browse, with the user, the user account information including the bill in question. Accordingly, the CSA points and clicks at an icon on the agent service page to request such account information. This request contains the new URL where such account information is stored. The request is transmitted from browser 171 to HTTP server 109, along with the CSA cookie previously described. Having learned of the transmitted request, surrogate 173 communicates a copy of the request to surrogate 153 through controller 111. Surrogate 153 then causes browser 151 to transmit a similar request to HTTP server 109, along with the customer cookie previously described.

Conversely, the user may utilize browser 151 to initiate a request including a change in the URL to look up different data to explain the billing error. In that case, surrogate 153 similarly forwards a copy of such a request to surrogate 173 through controller 111. Surrogate 173 then directs browser 171 to issue a similar request. As such, as the session progresses, the CSA and the user manage to synchronously go from one URL to another to collaboratively browse relevant HTML documents and, based on the findings, resolve the problem at hand through the textual or voice communications.

However, in accordance with the invention, the version of each document browsed by the user may not be identical to the version browsed by the CSA even though they originate from the same document. In a preferred embodiment, the user version is a subset of the corresponding CSA version. This asymmetric collaborative browsing approach is advantageous in many applications including the above customer service application. In particular, in resolving a bill problem as in the above customer service session, it is desirable to have the CSA in possession of more data than the user. For example, both CSA and user versions of the user account document show the same user account history information including the bill in question. However, to serve the customer efficiently, the CSA is privy to certain proprietary data which appears in the CSA version but not the user version. Such proprietary data includes internal resolutions of past complaints by the same user, the frequency of complaints, the credit history of the user, the rating of the user as a customer, etc.

To that end, HTTP server 109 is programmed to distinguish a user's data request from a CSA's request based on the cookie accompanying each request. If a request is accompanied by a CSA cookie identifiable as such by its header or format, HTTP server 109 retrieves from host computer 115 a CSA version of the document, which most likely is a full version thereof. Otherwise, if a request is accompanied by, a customer cookie identifiable as such by its header or format, HTTP 109 retrieves from host computer 115 a redacted version of the document, excluding the proprietary data.

The foregoing merely illustrates the principles of the invention. It will thus be appreciated that a person skilled in the art will be able to devise numerous other arrangements which embody the principles of the invention and are thus within its spirit and scope.

For example, in the disclosed embodiment, the determination of whether a data request is attributed to a CSA or a user is based on the cookie information accompanying the data request. However, it will be appreciated that the cookie information need not accompany the data request. Rather, it may be made part of the data request, or derivable from the data request. Furthermore, one may utilize other indicia than the cookie to identify the originator of the request. For example, one may use the agent login ID in lieu of the CSA cookie, and the user login ID in lieu of the customer cookie, to achieve the necessary distinction. The IP port numbers associated with the respective user's and CSA's browsers may also be used for that purpose.

In addition, it may be desirable to have the customer cookie survive a predetermined period of time after the customer service session is over. During this period, if the user invokes another customer service session, based on the customer ID number in the surviving cookie, manager processor 107 can re-connect the user with the CSA previously assigned to the user, provided that the CSA is available. This feature may be achieved by including in the customer cookie of FIG. 2 an additional field specifying an expiration time of the cookie. This expiration time may be set at the moment when the value of bit 205 is changed from "1" to "0" (i.e., when a user is disconnected from the agent). Thus, for example, with such a feature, if a user has unfinished business in a first customer service session, the user can advantageously carry on the business in a second session with the previous CSA as long as the second session is invoked within the expiration time.

Moreover, in the disclosed embodiment, after a CSA is assigned by server system 100 to assist a customer, an agent service page appears on the CSA's computer. It will be appreciated that this page will incorporate information concerning the web page which the assigned customer was previously on, e.g., a catalog page, so that the CSA may better anticipate and respond to the customer's inquiries.

Finally, system 100 is disclosed herein in a form in which various system functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

We claim:

1. Server apparatus for providing data to at least first and second receivers for concurrent browsing of said data comprising:

a controller for connecting the first receiver with the second receiver;

an interface for receiving from the first receiver a first request for particular data, said first request including indicator information, the second receiver generating a second request for said particular data in response to said first request, the second request being received by the interface; and a processor for providing a first version of said particular data to the first receiver in response to the first request, and a second version of said particular data to the second receiver in response to the second request, a difference between the first version and the second version being a function of at least said indicator information.

2. The apparatus of claim 1 wherein said indicator information includes cookie information.

3. The apparatus of claim 1 wherein said indicator information identifies an originator of the first request.

4. The apparatus of claim 1 wherein said indicator information includes information representing a time when the indicator information expires.

5. The apparatus of claim 1 wherein said processor includes said interface.

6. Server apparatus for providing data to at least first and second receivers for concurrent browsing of said data comprising:

an interface for receiving, from the first receiver, a first request for particular data, the first request including first indicator information;

a control element responsive to the first request for causing the second receiver to initiate a second request for said particular data to said interface, said second request including second indicator information different from said first indicator information; and a processor for distinguishing the first request from the second request based on a difference between the respective first and second indicator information therein, said interface providing a first version of said particular data to the first receiver in response to the first request and a second version of said particular data to the second receiver in response to the second request, said first version being different from said second version.

7. The apparatus of claim 6 wherein said first and second requests have respective portions which specify said particular data, said respective portions being identical.

8. The apparatus of claim 6 wherein the first indicator information and the second indicator information identify respective originators of the first and second requests.

9. The apparatus of claim 6 wherein the first indicator information and the second indicator information respectively include first cookie information and second cookie information.

10. The apparatus of claim 6 wherein said particular data includes account data.

11. The apparatus of claim 6 wherein said processor includes said control element and said interface.

12. The apparatus of claim 6 wherein said second version is a subset of said first version.

13. The apparatus of claim 12 wherein said first version includes proprietary data.

14. The apparatus of claim 6 wherein said interface receives at least one of the first and second requests from a communication network.

15. The apparatus of claim 14 wherein said communication network includes at least a portion of the Internet.

16. The apparatus of claim 14 wherein said communication network includes at least a portion of the World Wide Web (WWW).

17. Server apparatus for providing data to at least first and second receivers for concurrent browsing of said data comprising:
  an interface for receiving, from the first receiver, a first request for particular data, said first request being attributed to a first originator;
  a control element responsive to said first request for causing the second receiver to initiate a second request for said particular data to said interface, said second request being attributed to a second originator different from said first originator; and
  a processor responsive to the first and second requests for identifying the first originator and second originator to which the respective first and second requests are attributed, said processor providing a first version of said particular data to the first receiver and a second version of said particular data to the second receiver, said first version being different from said second version.

18. The apparatus of claim 17 wherein said first and second requests have respective portions which specify said particular data, said respective portions being identical.

19. The apparatus of claim 17 wherein said first originator is associated with a service representative and said second originator is associated with a user served by the service representative.

20. The apparatus of claim 17 wherein said first request includes information concerning said first originator.

21. The apparatus of claim 17 wherein said processor includes said interface.

22. The apparatus of claim 17 wherein said second version is a subset of said first version.

23. The apparatus of claim 22 wherein said first version includes proprietary data.

24. Server apparatus for providing data to at least first and second receivers for concurrent browsing of said data comprising:
  an interface for receiving, from the first receiver, a first request for particular data, said first request being attributed to a first originator;
  a control element responsive to said first request for causing the second, receiver to initiate a second request for said particular data to said interface, said second request being attributed to a second originator different from said first originator; and
  a processor responsive to the first and second requests for providing a first version of said particular data to the first receiver and a second version of said particular data to the second receiver, said first version being different from said second version as a function of at least a portion of identification information for said first and second originators.

25. The apparatus of claim 24 wherein said first and second requests have respective portions which specify said particular data, said respective portions being identical.

26. The apparatus of claim 24 wherein said first originator is associated with a service representative and said second originator is associated with a user served by the service representative.

27. The apparatus of claim 24 wherein said first request includes information concerning said first originator.

28. The apparatus of claim 24 wherein said processor includes said interface.

29. The apparatus of claim 24 wherein said second version is a subset of said first version.

30. The apparatus of claim 29 wherein said first version includes proprietary data.

31. A server system comprising:
  at least a first device and a second device;
  means for receiving a first request for particular data, the first request being associated with the first device;
  means responsive to the first request for causing an initiation of a second request for said particular data, the second request being associated with the second device;
  means for distinguishing the first request from the second request based on associations thereof with the respective first and second devices; and
  means for providing a first version of said particular data to said first device in response to the first request and a second version of said particular data to said second device in response to the second request, said first version being different from said second version.

32. The system of claim 31 wherein said first and second requests have respective portions which specify said particular data, said respective portions being identical.

33. The system of claim 31 wherein at least one of the first and second devices includes a personal computer.

34. The system of claim 31 wherein the causing means includes a web browser.

35. The system of claim 31 wherein the causing means includes a surrogate.

36. The system of claim 35 wherein said surrogate forwards a copy of at least part of said first request to said second device.

37. The system of claim 35 wherein said second device forwards a copy of at least part of said second request to said surrogate.

38. A method for providing data to at least first and second receivers for concurrent browsing of said data comprising:
  connecting the first receiver with the second receiver;
  receiving from the first receiver a first request for particular data, said first request including indicator information;
  generating by the second receiver a second request for said particular data in response to said first request, the second request being received by the interface; and
  providing a first version of said particular data to the first receiver in response to the first request, and a second version of said particular data to the second receiver in response to the second request, a difference between the first version and the second version being a function of at least said indicator information.

39. The method of claim 38 wherein said indicator information includes cookie information.

40. The method of claim 38 wherein said indicator information identifies an originator of the first request.

41. The method of claim 38 wherein said indicator information includes information representing a time when the indicator information expires.

42. A method for providing data to at least first and second receivers for concurrent browsing of said data comprising the steps of:

receiving, from the first receiver, a first request for particular data, said first request including first indicator information;

causing the second receiver to initiate a second request for said particular data in response to said first request, said second request including second indicator information different from said first indicator information;

distinguishing the first request from the second request based on a difference between the respective first and second indicator information therein; and providing a first version of said particular data to the first receiver in response to the first request, and a second version of said particular data to the second receiver in response to the second request, said first version being different from said second version.

43. The method of claim 42 wherein said first and second requests have respective portions which specify said particular data, said respective portions being identical.

44. The method of claim 42 wherein the first indicator information and the second indicator information identify respective originators of the first and second requests.

45. The method of claim 42 wherein the first indicator information and the second indicator information respectively include first cookie information and second cookie information.

46. The method of claim 42 wherein said particular data includes account data.

47. The method of claim 42 wherein said second version is a subset of said first version.

48. The method of claim 47 wherein said first version includes proprietary data.

49. The method of claim 42 wherein at least one of the first and second requests is received from a communication network.

50. The method of claim 49 wherein said communication network includes at least a portion of the Internet.

51. The method of claim 49 wherein said communication network includes at least a portion of the WWW.

52. A method for providing data to at least first and second receivers for concurrent browsing of said data comprising the steps of:

receiving, from the first receiver, a first request for particular data, said first request being attributed to a first originator;

causing the second receiver to initiate a second request for said particular data in response to said first request, said second request being attributed to a second originator different from said first originator;

identifying the first originator and second originator to which the respective first and second requests are attributed; and providing a first version of said particular data to the first receiver in response to the first request and a second version of said particular data to the second receiver in response to the second request, said first version being different from said second version.

53. The method of claim 52 wherein said first and second requests have respective portions which specify said particular data, said respective portions being identical.

54. The method of claim 52 wherein said first originator is associated with a service representative and said second originator is associated with a user served by the service representative.

55. The method of claim 52 wherein said first request includes information concerning said first originator.

56. The method of claim 52 wherein said second version is a subset of said first version.

57. The method of claim 56 wherein said first version includes proprietary data.

58. A method for providing data to at least first and second receivers for concurrent browsing of said data comprising the steps of:

receiving, from the first receiver, a first request for particular data, said first request being attributed to a first originator;

causing the second receiver to initiate a second request for said particular data in response to said first request, said second request being attributed to a second originator different from said first originator; and providing a first version of said particular data to the first receiver in response to the first request and a second version of said particular data to the second receiver in response to the second request, said first version being different from said second version as a function of at least a portion of identification information for said first and second originators.

59. The method of claim 58 wherein said first and second requests have respective portions which specify said particular data, said respective portions being identical.

60. The method of claim 58 wherein said first originator is associated with a service representative and said second originator is associated with a user served by the service representative.

61. The method of claim 58 wherein said first request includes information concerning said first originator.

62. The method of claim 58 wherein said second version is a subset of said first version.

63. The method of claim 62 wherein said first version includes proprietary data.

* * * * *